UNITED STATES PATENT OFFICE.

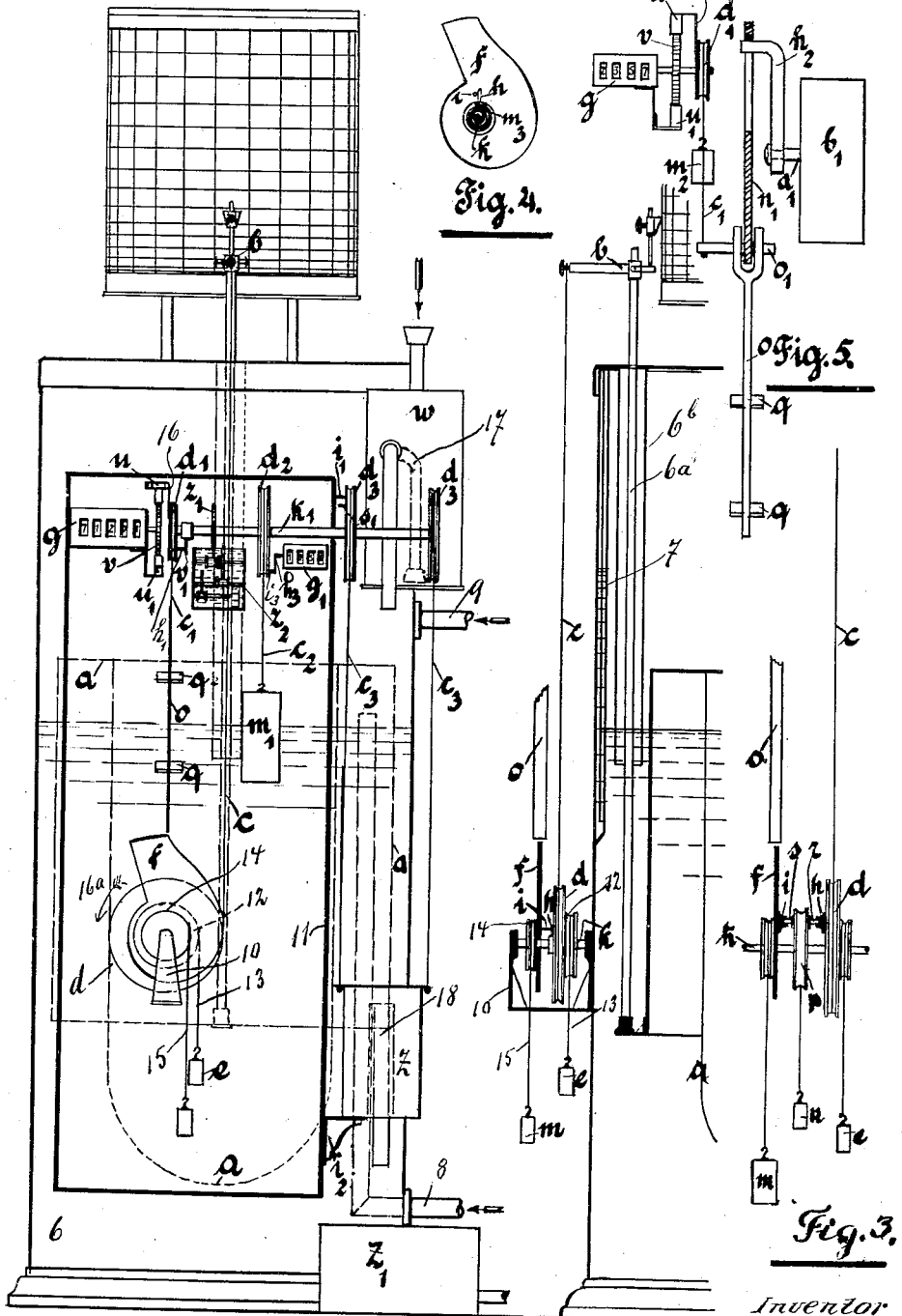

HEINRICH CONTZEN, OF DUSSELDORF, GERMANY.

INSTRUMENT FOR MEASURING THE VELOCITY OF FLOW OF FLUIDS.

1,128,949.	Specification of Letters Patent.	Patented Feb. 16, 1915.

Application filed June 27, 1913. Serial No. 776,162.

*To all whom it may concern:*

Be it known that I, HEINRICH CONTZEN, citizen of the German Empire, residing at Dusseldorf, Germany, have invented certain new and useful Improvements in Instruments for Measuring the Velocity of Flow of Fluids, of which the following is a specification.

This invention relates to improvements in instruments used to record the velocity of flow of fluids such as air, gas, steam or the like, and designed to work on the principle of the measurement of dynamic forces such as the Pitot tubes.

The invention relates more particularly to the recording mechanism whereby data is obtained for calculating not only the velocity, but also the quantity of fluid which has passed through the duct in any given time even although the velocity of flow has been varying.

The invention will be more readily understood from the following description of one convenient form illustrated by way of example in the accompanying drawings in which:

Figure 1 is a somewhat diagrammatic representation of the instrument in front view. Fig. 2 is a side view of part of the mechanism. Fig. 3 is a side view of a modified form. Fig. 4 is a view of a modified form of cam. Fig. 5 is a detail view of a modified form of recording mechanism.

In carrying the invention into effect according to one form as shown in Fig. 1, a member $a$, is provided which is acted upon by the different pressures due to the different dynamic forces such as are obtained by the two connections from the well known Pitot tubes. The member $a$, is in the form shown, shaped as a bell inclosed within a casing 6, which is sealed at its top end and also by an annular seal 7. A pipe 8 leads from one of the Pitot connections into the interior of the bell $a$, while the other Pitot tube is connected up to a pipe 9 which opens into the exterior of the bell $a$, and the upper part of the closed casing 6. The bell $a$, is thus subjected in the known manner to the pressure difference of the Pitot tubes and rises and falls with variations which are recorded by a pencil $b$, supported on an upright arm $6^a$, passing within a sealed tube $6^b$.

According to this invention, the pencil $b$, is connected by a cord $c$, to a pulley $d$, which is mounted loosely on a spindle $k$. The spindle $k$, is suitably supported in a bracket 10 fixed to the exterior of the casing 6. A box or outside casing 11 may be suitably fixed to the casing 6. This box is shown in section in Fig. 1, but is omitted in Fig. 2, and it may be provided with a glass front or suitable openings to enable the inspection and reading of the recording mechanism. The pulley $d$, has also a small pulley rim 12 to which there is fixed a cord 13, carrying a weight $e$. The cord $c$, tends to pull the pulley $d$, round when the bell $a$, rises and the cord 13 and weight $e$, pull the pulley $d$, in the opposite direction so that this pulley follows the movements of the bell.

The pulley $d$, is provided with a projecting pin $h$, which during rotation of the pulley engages a pin $i$, fixed on a cam plate $f$, loosely mounted on the spindle $k$. The cam plate $f$, has fixed to it a pulley 14, to which a cord 15 carrying a weight $m$, is fixed. The bell $a$, in rising tends to move the pulley $d$, and cam plate $f$, in the direction of the arrow $16^a$ in Fig. 1. The cam plate $f$, is of a flat spiral outline or substantially so. In the rotation of the cam plate $f$, under the action of the bell $a$, in rising therefor, a lower part of the sam is brought opposite a recording member in the form of a vertical finger piece $o$, suitably guided in brackets $q$.

The recording finger piece $o$ is connected by a cord $c_1$ to a pulley $d_1$ fixed to rotate with the shaft $k_1$, mounted in the upper part of the casing 11. The pulley $d_1$, is provided with a pin $h_1$, projecting laterally therefrom to engage with a radial arm $v_1$, on the shaft $k_1$. An oil damping device contained in a tank $z_2$, and operated from a toothed wheel $z_1$, on the shaft $k_1$, damps the rotation of the shaft $k_1$, when it is rotated by mechanism described later. To the left of the pulley $d_1$, in Fig. 1, there is mounted a counting box $g$, operated from a ratchet wheel $v$, having a driving pawl $u$, and a detent pawl $u$, engaging therewith. The driving pawl $u$, is carried by an arm 16 on the pulley $d_1$. The pawl $u$, only drives the ratchet wheel $v$, when the finger $o$, falls and the amount of the fall of finger $o$, is limited by the position of the cam $f$, which is in turn dependent upon the position of the bell $a$. The counter $g$, thus gives the sum of the ordinates of a curve and these ordinates may be assumed to be erected on a base spaced into equal time intervals. The time intervals are determined by the mechanism for rotating the shaft $k_1$ and the number of intervals is recorded by a counter $g_1$, which is operated by a projecting pin $i_3$, engaging an arm $h_3$, of the counter $g_1$. The pulley $d_2$ has fixed to it a cord $c_2$ carrying a weight $m_1$, tending to move the shaft $k_1$ in one direction. The shaft $k_1$, is moved in the other direction by a water or liquid operated mechanism. A tank $w$, is provided with a siphon 17. When the tank $w$, is filled to a height above the bend of the siphon, liquid flows therethrough into a tank $z$, carried by cords $c_3$, fixed to pulleys $d_3$ on the shaft $k_1$. When sufficient weight of liquid has passed into the tank $z$, this tank falls and rotates the shaft $k_1$, against the counter weight $m_1$. When the tank $z$, falls to the brackets $i_2$, it stops and liquid may continue to flow into the tank $z$, until the siphon 18 in this tank is filled. The liquid then siphons out of the tank $z$, into the waste tank $z_1$, and the bucket or tank $z$, rises owing to the weight $m_1$, overcoming the weight of the empty tank. The mechanism described raises and lowers the fingers $o$, periodically.

It will be readily understood how it is possible with the above data to be read from the counters $g$ and $g_1$, it is possible to calculate the mean velocity of flow of the gases to be measured and therefore the quantity passing the duct. In some cases the two counters may be coupled to a logarithmic counter from which the average velocity or the quantity of gas passing may be directly read. The pencil $b$, will of course register the fluctuations in the ordinary manner.

In some cases it may be advisable to allow the bell $a$, free motion either up or down after the cam $f$, is arrested by the finger $o$. The arrangement of pins $h$ and $i$, in Fig. 1, only leaves freedom of movement in one direction. To give freedom of movement in both directions, an intermediate pulley $p$ (Fig. 3) may be interposed having pins $s$ and $r$, projecting laterally from opposite sides to engage with the lateral projections $h$ and $i$, on the pulley $d$ and cam $f$, resepectively. The pulley $p$, is also provided with a weight $n$, so that it follows the pulley $d$, but when pushed back by the pulley carries the pin $s$, away from projection $i$, and therefore the cam $f$, only follows the pin $i$, in such a case if it is not held by the finger $o$.

In place of the weights $m$ and $e$, for retaining the projections $h$ and $i$, in contact I may employ other means such as a spiral spring $m_3$, Fig. 4, fixed at one end to the spindle $k$, and at the other to the cam $f$.

When the finger $o$, is arrested, the cord $c_1$ slackens and may pass from the groove of pulley $d_1$ to avoid this difficulty I may operate the finger $o$, from the crank $h_2$ having a pin movable in a slot in a link $n_1$, pivoted to the finger at $o_1$, while the pin $o_1$, is connected as before by the cord $c_1$ to the pulley $d_1$.

I claim:—

1. An instrument for recording the flow of gas comprising a bell subjected to and movable under differences of pressure caused by the flow of gas to be measured, a cam movable independently of but following the movements of said bell, a finger periodically movable to contact with said cam to mutually arrest said finger and cam, a motor operating said finger and movable independently of said finger and means for recording and summating the periodic movement of said finger.

2. In a recording instrument in combination with a member movable in a rectilinear path under variations in pressure, a rotatable cam, means for rotating said rotatable cam in proportion to the rectilinear movements of said pressure member, a recording member, a liquid motor for periodically moving said recording member into engagement with said cam, means for recording the amount of movement of said recording member, means for counting the number of records made, and an oil damping device for controlling the operation of said liquid motor.

3. In combination, a closed container, a bell therein, a pressure supply to the interior of said bell, a pressure supply to the exterior of said bell, a rotatable pulley, means for retaining said pulley in one position, a connection from said bell to said pulley to move said pulley against the action of said retaining means, a cam having a spiral contour, said cam being freely mounted coaxially with said pulley, a member intermediate between said cam and said pulley to move the cam with said pulley but leave said pulley free to rotate independently of the cam, a recording finger movable on to the surface of said cam to arrest the same, a rotatable element for moving said recording finger, ratchet mechanism for recording the amount of the movement of said finger, a counter coöperating with said rotatable element for moving said recording finger and time mechanism for periodically moving said recording finger on to said cam.

In testimony whereof I have signed my name to this specification in the presence of two subscribing witnesses.

HEINRICH CONTZEN.

Witnesses:
 JACOB PLANTS,
 LEWIS VANDORY.